July 21, 1964

H. F. BOK ETAL 3,141,938

CONTROL DEVICE FOR EVAPORATION VESSEL HAVING A DEFORMABLE FLOAT

Filed Nov. 8, 1961

Inventor
EDWARD BOK
HENDRIK F. BOK
By John Gibson Semmes
Attorney

Inventor
EDWARD BOK
HENDRIK F. BOK
By John Gibson Semmes
Attorney 3,141,938
CONTROL DEVICE FOR EVAPORATION VESSEL
HAVING A DEFORMABLE FLOAT
Hendrik F. Bok, 1 Acushnet Road, Mattapoisett, Mass., and Edward Bok, Burgemeester Amersfoortlaan 82, Badhoevedorp, Netherlands
Filed Nov. 8, 1961, Ser. No. 150,971
1 Claim. (Cl. 200—84)

The present device relates to a control device, particularly a device for controlling the supply of electricity to heating elements positioned within a vessel containing liquid to be vaporized and, simultaneously, for controlling the pumping of liquid to said vessel.

The present device has been particularly adapted for control of paint spraying units such as are the subject of applicants' U.S. Patents Nos. 2,790,063; 2,840,681 and 2,980,339, wherein a hydrocarbon which is a thinner for the paint is heated until vaporized in a pressure vessel, then utilized as a spraying medium for the paint. To this end, the present device controls the supply of electricity to the heating elements and to the pump for introducing the liquid into the vessel. Thus, the heating elements and pump in the pressure vessel are controlled in terms of vapor pressure and hydrocarbon level within the vessel. To this end a float is employed within the vessel together with a pivotable mercury switch whereby pumping of hydrocarbon liquid to the vessel is controlled in terms of the vertical position of the float and electricity supplied to the heating elements is controlledly switched off, as the hydrocarbon liquid supply is depleted in the vessel. In order that vapor pressure within the pressure vessel may be maintained as constantly as possible, frequent switching on and switching off of electricity supplied to the heating elements is required. Conventionally, switching on and switching off of similar elements is accomplished by a pivoted lever which is spring-urged to switch on electricity and pivotable through operating stress to switch off electricity. According to the present invention, a control bellows device is employed in combination with a compression spring. The compression spring urges the heating element electricity switch to switch "on" position and the bellows, as it is affected by increased vapor pressure in the pressure vessel, urges the heating element electricity switch to switch "off" position. Thus, the bellows and compression spring counteract each other to the extent that sustained vapor pressure is required for regulating electricity supplied to the heating elements. The heating element electric switch comprises a mercury switch positioned within the pressure vessel and connected via a movable arm to the float. Inasmuch as heavy and rather inflexible wiring is required in connection with a mercury switch, it is estimated that a switching force of at least one point five (1.5) kgcm. is required, if this mercury switch is to regulate satisfactorily the supply of electricity to the heating elements. This required force is easily obtainable from a float device positioned within the vessel in combination with a movable long float arm so that the vertical reciprocation of the float can pivot the mercury switch and thus regulate the supply of electricity.

Since tolerances for vapor pressure are close and slight differences in pressure are required to switch "on" and switch "off" electricity supplied to the heating elements, it is necessary that the aforementioned control bellows be sensitive to the slightest changes in vapor pressure. To this end and in addition to the compression spring which counteracts the bellows, a switch "on" spring is employed which connects the bellows with the electrical switches. This switch "on" spring connects a pressure surface of the control bellows with an electrical switch lever which in turn is connected to the mercury switch. Thus, the switch "on" spring switches "on" electricity for the heating element when the pressure control bellows is not operating. This switch on spring is located on the axis of a pressure controller which is also the center line of the control bellows.

Accordingly, it is an object of invention to provide a control device for use in vaporization chambers wherein supply of electricity to heating elements may be controlled in terms of vapor pressure within said vessel.

Another object of invention is to provide a control device wherein in a vessel for vaporization of a liquid electricity supplied to the heating elements may be controlled in terms of vapor pressure, as well as liquid level within said vessel.

Another object of invention is to provide a control device for use in a vessel for vaporizing liquid which control device will switch "off" electricity supplied to heating elements in said vessel when liquid is depleted from said vessel.

Yet additional objects of invention will become apparent from the ensuing specification and attached drawings wherein:

FIG. 1 is a fragmentary longitudinal section of a control device showing the float mounted within a pressure vessel and controlling a tristop mercury switch by means of float arm or the like.

FIG. 3 is a fragmentary side elevation of a pivotal mercury switch which controls the supply of electricity to pumps which introduce hydrocarbon liquid into the vessel.

Figures 1, 3:
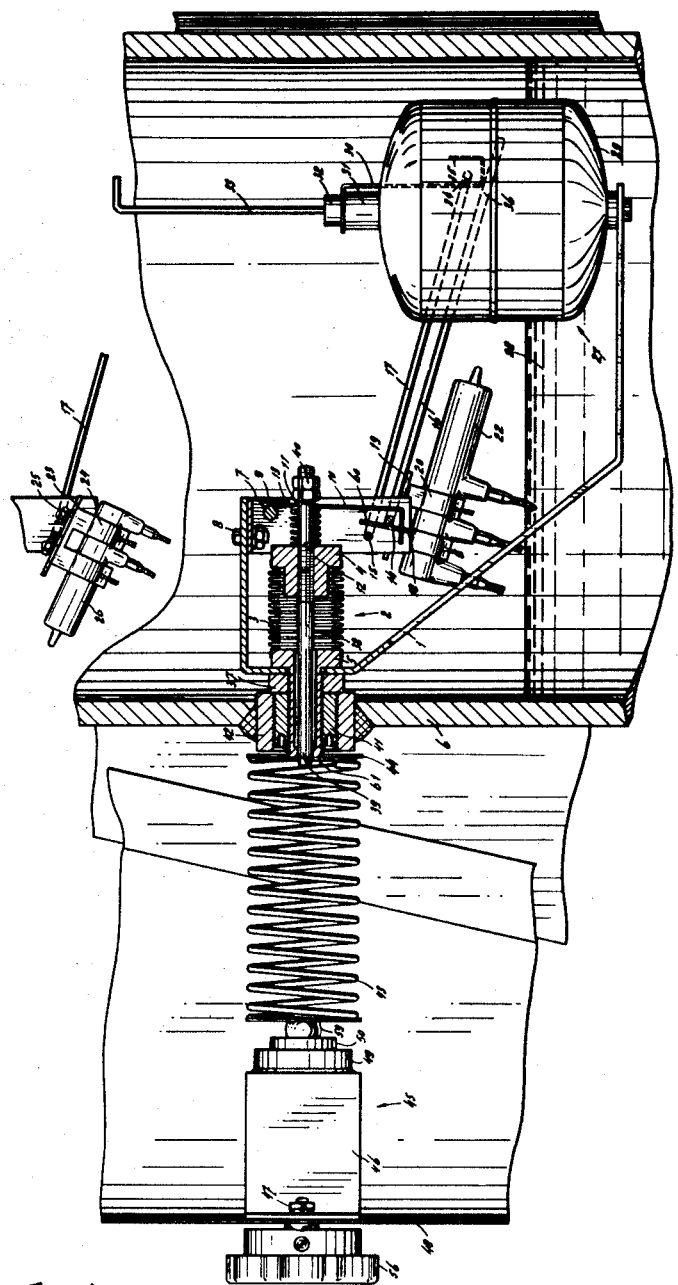

In FIG. 1 pressure controller generally designated as 2 is shown as supported within pressure vessel 6 by means of bracket 1. Pressure controller 2 comprises bellows body 3 which at one end has a pressure tight connection to pressure body 4 and on the other end has a pressure tight connection to threshold connecting piece 5. As will be apparent, vapor pressure within vessel 6 causes longitudinal reciprocation of bellows 3 about pin 38. Vertical side plates 7 are fastened to opposite sides of bracket 1 by means of screw connection 8. Horizontal shaft 9 which turns in bracket 7 supports switch lever 10 so that aperture 11 in lever 10 encompasses switch pin 12 which is an extension of the pressure controller 2. Switch pin 12 is passed through aperture 11 and is mounted at its other end in pressure surface 4. In between pressure surface 4 and switch lever 10 switch in spring 13 is placed to encompass pin 12. Bent end portions 14 and 15 of the respective lever arms or float rods 16 and 17 bear in the bracket 1 bottom portion for pivoting. Switch plate 18 is fastened to switch arm 16 bent portion 14 so that it fits within a corresponding slot in the bottom portion of switch lever 10 for linking purposes. Horizontal switch plate 19 is fastened to switch arm 16 so as to abut side plate 7 and thereby limit longitudinal play of bent end 14. Mercury switch 22 is secured to switch plate 19 by means of clamp 20 and screw connection 21. Mercury switch 22 governs switching "on" and switching "off" of electricity supplied to the heating elements (not illustrated) which are of course, mounted within the pressure vessel so as to contact the hydrocarbon liquid with which it is filled.

Figure 2:
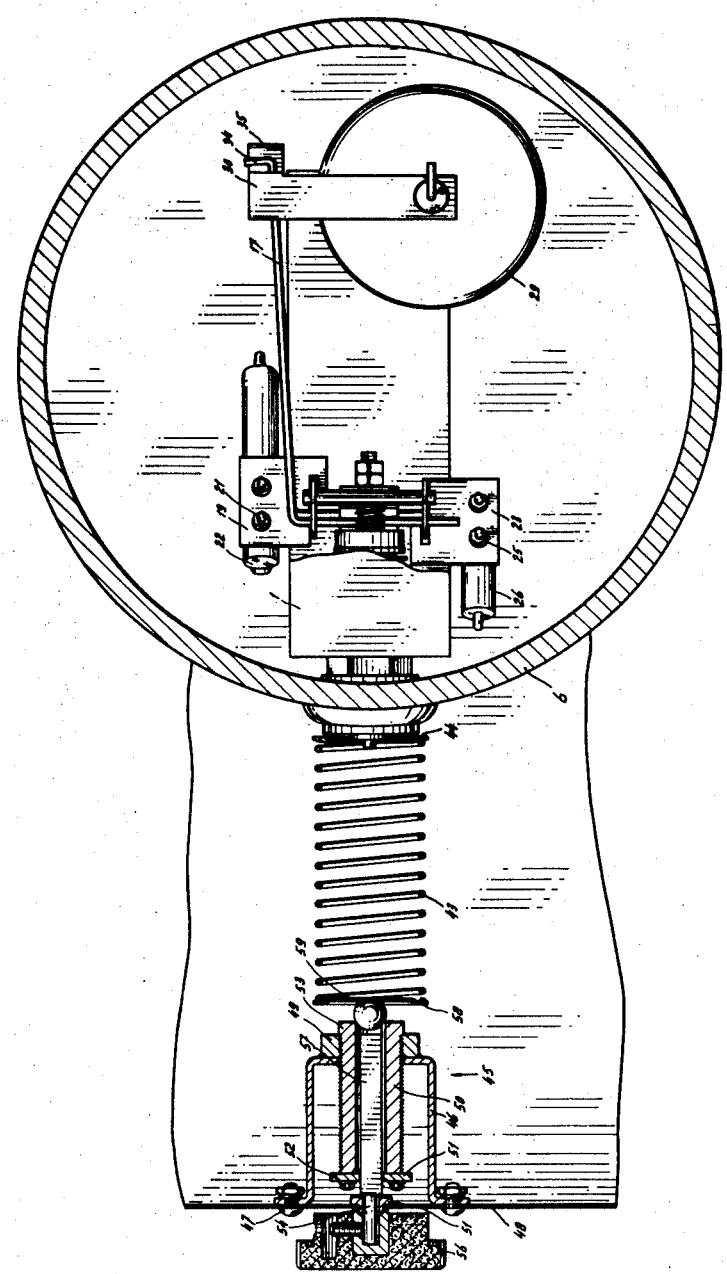
FIG. 2 is a fragmentary top plan of the control device, partially in section, showing two mercury switches positioned within the pressure vessel adjacent one end of the float control rod.

Switch plate 23 (see FIG. 2) is mounted on the bent end portion 15 of float control rod 17 so as to abut side plate 7 and similarly limit longitudinal play of bent end 15. Mercury switch 26 is mounted upon switch plate 23 by means of clamp 24 and screw connection 25. During operation mercury switch 26 switches on and off the electricity supplied to the pump which introduces the hydrocarbon liquid to the vessel. Thus, as float 29 rises vertically, together with the level of liquid in the pressure vessel, float arm 17 pivots, causing to pivot mercury switches 22 and 26 and thereby switch on and off electricity supplied to the heating elements and pump, respectively. Float device 27 consists of float 29 having float bracket 30 fixed thereto and which is slidable by means of collars 31 and 32 about guiding shaft 33. Shaft 33 is fastened at its base to supporting bracket 1. Float switch arm 17 with its float end bent portion 34 is passed through an aperture in float bracket 30 and into offset portion 35 of float strap 30. During vertical actuation of float 29 offset portion 35 fixes the position of the float with respect to switch arm 17. Float end portion 36 of switch arm 16 is located beneath float bracket offset portions 35 and is, correspondingly, depressed by float 29 in its downward reciprocation.

Nut 37 secures pressure controller 2 to bracket 1. Switch pin extension 38 is passed through threaded connecting piece 5 so that its exterior end 39 protrudes beyond vessel 6 wall. At its interior end extension 38 abuts switch end 12, which passes through switch lever 10 and engages nuts 40, provided for longitudinal adjustment of the switch plate 10 with respect to pin 12. The control device is mounted within vessel wall 6 by means of threaded flanges 42 in the vessel walls and inner threaded piece 41 which threadedly engages connecting piece 5. Threaded flange 42 may be secured by soldering or the like. Spring rest disc 44 abuts end 39 under pressure of spring 43 which is adjustable by means of pressure controller unit 45. Bracket 46 is fixed inwardly of housing 48 by means of screws 47 and within the housing threaded nut 49 is fastened to bracket 46. Interiorly threaded screw piece 50 engages threaded nut 49. Stop plate 52, attached to screw piece 50 by means of screws 52, limits longitudinal reciprocation of screw piece at one end whereas on the other end shoulder 53 abuts nut 49. Pressure control pin 54 passes through guide bushing 51, secured in housing 48. Pin 54 with its profile part 57 passes through correspondingly profile part of stop plate 52. Pressure control spring 43 abuts spring rest disc 58, thence ball 59 and profile part 57.

During non-spraying operation when liquid 28 is at a low level in vessel 6, such as illustrated in FIG. 1, float 29 is in its lowest position. Also, in FIG. 1 screw piece 50 with the help of the adjusting knob 56 and pin 54 is screwed in the direction of the housing wall 48 so that pressure control spring 43 has minimum tension. Pressure spring 43 presses by a spring rest disc 44 on switch pin 38. Surface 61 of threaded member 5 serves as a stop surface for the spring rest disc 44 so that switch pin end 39 can move longitudinally only a short distance. In FIG. 1 switch pin 12 is illustrated in its maximum distance from the interior wall of vessel 6 in which position screw adjusting nuts lie free from switch lever plate 10. As illustrated, float 29 has reciprocated float arm 16 downwardly via float bracket 30 as a result of which the tilted position of mercury switch 22, as illustrated is obtained. In this tilted position the mercury switch 22 acts to cut off electricity to the heating elements and thus serves as a dry boiling safeguard. The switch "off" for dry boiling safety position has been obtained against the action of switch "on" spring 13, since the switch "on" torque obtained with spring 13 and acting upon switch lever 10 and switch plate 18 is smaller than the switch off torque obtained with float 29 in the lower position illustrated. Pressure controller spring 43 cannot override this control system since the stop surface 61 prevents this. Similarly, in the position illustrated in FIG. 1 float 29 in its downward actuation turns mercury switch 26 in such a way that electricity supplied to the pump is switched "on" for pumping a liquid into the pressure vessel. When the pumping apparatus is thus activated the level of liquid 28 will rise. As liquid level rises float 29 gradually loses its force acting upon switch arms 16 and 17, as a result of which at a given moment the switch "on" torque of spring 13 will exceed the switch "off" torque of float 29. When switch arm 16 turns upward this turn is transmitted via bent end 14 to mercury switch 22 for pivoting as a result of which at a given moment mercury switch 22 will switch in the heating elements. Liquid level will continue to rise normally. Then at a given moment switch plate 18 will come to rest with its part 60 against the bent end 16 of switch arm 17 as a result of which the switch position of switch 22 is fixed and switch arm 16 cannot turn upward any further. When float 29 continues to rise it will raise switch arm 17 so far that mercury switch 26 turns off the liquid pump. Meanwhile a vapor phase under pressure is being generated by heat liberated from the heating elements. This vapor pressure acts on the pressure surface 4 of pressure controller contrary to the force of pressure controller spring 43. During initial stages of operation of pressure controller 2, switch "on" spring 13 assists the force derived from vapor pressure and at a given moment this combination of forces will exceed that of compression spring 43. Then, pressure surface 4 together with switch pin 12 will move longitudinally toward the adjacent interior wall of pressure vessel 6, to the extent that threaded nuts 40 on pin 12 will come to rest against switch lever 10. Now the switch "on" spring 13 serves as a buffer, insuring that after vapor pressure has risen to the extent that without the help of switch "on" spring 13 the force of pressure controller spring 43 is exceeded, limiting movement of pressure surface 4 will move against the spring tension of spring 43 and against that of bellows 3 towards the adjacent wall of vessel 6. Simultaneously, switch lever 10 while engaged by threaded nuts 40 is pivoted about shaft 9. This pivoting is with the assistance of switch plate 18 and extension 14 of switch arm 16 and results also in pivoting of mercury switch 22. Thus motion of pressure surface 4 towards the adjacent interior wall of pressure vessel 6 continues until mercury switch 22 pivots to the point that it switches off all electricity supplied to the heating element.

Vapor pressure will now decrease as a result of cooling down of the vessel or consumption of the vapor phase. As a result at a given moment tension on spring 43 exerted on pressure surface 4 will exceed that of the vapor phase on this pressure surface and pressure surface 4 will move longitudinally away from the adjacent wall of vessel 6. Mercury switch 22 will pivot towards its horizontal position via switch lever 10 and gradually will switch "on" the heating elements, after which the switching cycle is repeated. When during operation of the apparatus liquid level in vessel 6 drops, float 29 drops correspondingly and at a given moment mercury switch 26 will again switch on electricity for the pump motor with the result that liquid level is raised within vessel 6. However, if no liquid is supplied via the liquid pump, which may be the case if the supply conduit is empty, bracket 30 will come to rest on switch arm extension 36, as a result of which the downward turn of arm 16 will pivot mercury switch 22 and switch "off" the heating elements, as a dry boiling safety.

If higher vapor pressure is desired, adjusting knob 56 is turned and screw piece 50 is thus screwed via control pin 54 into threaded nut 49, as a result of which spring rest disc 58 also moves towards the pressure vessel exterior wall. By shortening compression spring 43 in its lengthwise direction, its spring tension will increase and thus the spring tension upon pressure surface 4 becomes greater, which tension must be exceeded by vapor pressure in order to exert switching controls during the operation of the pressure controller.

Thus, a simple switching control is obtained. The present control device controls the pumping of liquid to the vessel, limits and adjusts vapor pressure in the vessel and simultaneously serves as a dry boiling safety. Furthermore, if the control device should become totally inoperative a preascertained high vapor pressure deforms and sinks the float, thus switching "off" pumping and heating elements as dry boiling safety.

Having described one adaptation of their control device, but without limitation to the specific construction illustrated, applicants claim:

A control device for a pressure vessel of the type having a pump for introducing liquid into said vessel and heating elements for vaporization of liquid so introduced, comprising:

(a) a bellows mounted within said vessel and above the liquid so introduced;

(b) a float mounted in said vessel in contact with said liquid and being deformable at a pre-selected danger vapor pressure, so as to lose its buoyancy and fall to a bracket mounted in said liquid;

(c) electric switch means pivoted within said vessel and adjacent one end of said bellows, said electric switch means adapted to be connected to said pump and said heating elements;

(d) spring urged means interconnecting said bellows and said electric switch for pivoting said switch upon reciprocation of said bellows by vapor pressure, thereby adapted to switch on and off said heating element; and (e) lever arm means interconnecting said float and said mercury switch for pivoting said switch upon vertical actuation of said float and adapted to actuate said pump as liquid level falls in said float.

References Cited in the file of this patent

UNITED STATES PATENTS

| | | |
|---|---|---|
| 224,068 | Boyd et al. | Feb. 3, 1880 |
| 1,936,051 | Durdin | Nov. 21, 1933 |
| 1,949,371 | Dillman | Feb. 27, 1934 |
| 1,985,659 | Hickstein et al. | Dec. 25, 1934 |
| 2,076,547 | Carlson | Apr. 13, 1937 |
| 3,038,057 | Bok et al. | June 5, 1962 |